Sept. 21, 1954   L. P. MACARDIER   2,689,878
BINDING OF ARMORED CABLES
Filed Oct. 12, 1949
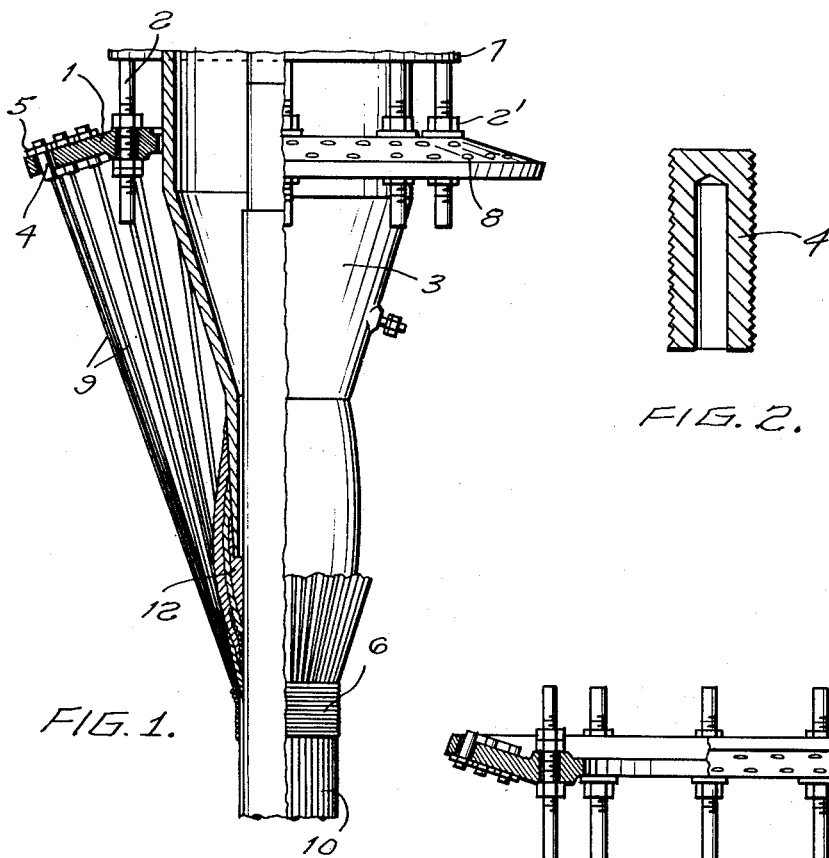
FIG. 1.
FIG. 2.
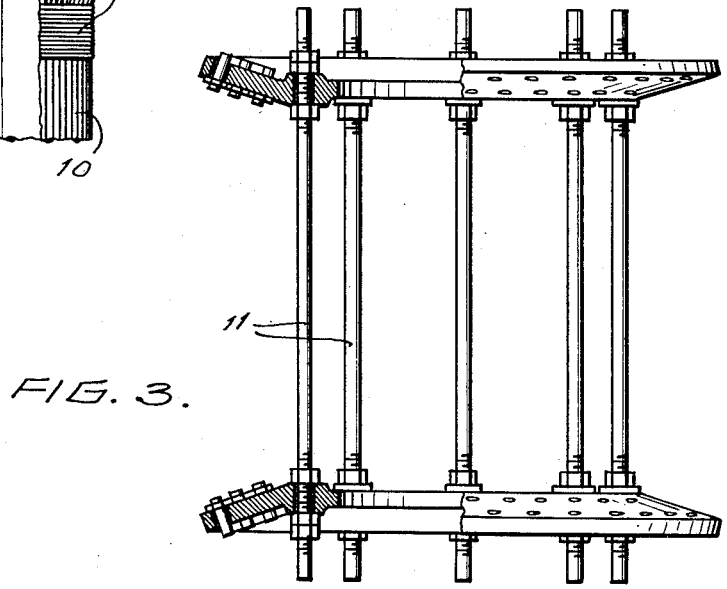
FIG. 3.
INVENTOR.
LOUIS. PIERRE MACARDIER
BY Patented Sept. 21, 1954

2,689,878

UNITED STATES PATENT OFFICE 2,689,878

BINDING OF ARMORED CABLES

Louis Pierre Macardier, Lyon, France, assignor to Compagnie Generale d'Electricite, Paris, France, a French corporation Application October 12, 1949, Serial No. 120,895

Claims priority, application France October 20, 1948

6 Claims. (Cl. 174—74)

This invention relates to electric cables and is concerned with electric cables of the type having a protective armouring of wire or metal strips or equivalent binding elements wound with a long pitch about said cable. Hereinafter such cables are referred to simply as armoured cables.

Electric cables which must withstand considerable tractive forces, for instance cables which have to descend mine shafts or to cross rivers, always comprise an external armouring constituted by one or more layers of wires or metal strips wound with a relatively long pitch equal to about 5 to 15 times the diameter of the cable. Similarly, electric high-tension cables operating under gas or oil pressure are also provided with armourings composed of one or more layers of wires or metal strips wound with a short and a long pitch, the shortpitch windings serving to bind the lead so as to prevent it bursting because of the internal pressure.

The discontinuity of longpitch armourings, either at a junction box or at a terminal box of the cable, has always constituted a problem, especially when the operating pressure is high, because the longpitch binding elements must be uniformly stretched, failing which the lead sheath tends to become elongated and to burst under the action of the internal pressure.

The object of the present invention is to overcome these disadvantages by employing an arrangement by means of which it is possible to adjust separately the tractive force exerted on each of the elements constituting the layers of the longpitch armouring.

According to the present invention there is provided a device for anchoring the armouring of armoured cables, at a discontinuity of the armouring thereof, comprising an annulus adapted to be fixed in a desired position and adapted to surround the cable, said annulus having one or more concentric rings of holes the total number of said holes being at least equal to the number of binding elements of the armouring which it is desired to anchor and further comprising means operable in connection with said holes so that the tension in the anchored binding elements may be adjusted.

For a better understanding of the nature of the invention the same will now be described with reference to the accompanying drawings in which Figure 1 is a view, half in section, of such an arrangement mounted on a terminal box, the manner in which the extremities of the armouring wires are secured being shown in the sectional half, Figure 2 is a sectional view of a detail of the said arrangement, and Figure 3 is a view, half in section, of the same arrangement completed for mounting on a junction box.

As is shown in Figure 1, a metal element 1 of annular form, is secured by tie rods 2 with nuts 2' to a collar 7 mounted on the terminal box or housing 3 of the accessory. The annular element 1 has in its periphery a number of holes 8 equal to the number of wires or strips 9 of which the armouring 10 is formed. These holes are regularly distributed in one or more circles.

As will be seen from the figure, the said annular element 1 is of such form that the wires or strips of the armouring take up a position perpendicular to the annular element after opening out to a suitable extent.

Each wire or strip is held fast in a screwthreaded sleeve 4 either by autogenous welding or by soft soldering. Figure 2 shows one of the sleeves in section. The sleeves may or may not be perforated throughout, according to whether they are to be welded by the autogenous method or soft-soldered, they must be of sufficient length to permit adjustment of the tractive force. This adjustment is effected by varying the tightness of the nuts 5 (Figure 1). Before the wires or strips constituting the armouring are welded or soldered, it is necessary to bind the armouring at 6 by steel wire or by means of a collar.

For three-phase cables, the annular element and the sleeves may consist of ordinary steel, but for single-core cables the annular element should preferably be of non-magnetic metal such as bronze, brass, non-magnetic steel, or the like. The sleeves 4 and the nuts 5 may be of magnetic or non-magnetic metal.

When it is desired to interrupt the armouring at junction boxes, for example, with submarine junctions, the two annular members of a junction box may be held together by tie rods, as is shown at 11 in Figure 3. The tie rods 11 pass through one or more collars connected to the junction box, and are secured to the said collars.

In the case of cables operating under high pressure and requiring a number of layers of armouring wires or strips of short and of long pitch, the shortpitch armourings are held by means of welded edge-to-edge bindings which cover these armourings at their extremities and also cover the fluid-tight weld between the covering of the cable and the metal parts of the junction or terminal boxes. If there are a number of longpitch armourings, the internal armourings of longpitch are held beyond the fluid-tight weld so as to cover this weld. They are maintained in position on the fluid-tight weld by welded edge-to-edge bindings, and are turned over at their extremities on these bindings. Finally, the wires or strips of the external armouring are, in accordance with the invention, welded or soldered as already explained in screwthreaded sleeves secured to an annular element with adjusting nuts by means of which all the wires or strips may be equally stretched.

The application of the arrangement according to the invention renders it possible to protect the weld 12 of the cable at the point at which it enters the box 3 (Fig. 1) from any mechanical stress emanating from the longitudinal forces due to the pressure to which the lead sheath is subjected. This is an important advantage in the case of high pressure cable installation.

I claim:

1. A connecting arrangement between a cable and an accessory, comprising, in combination, a housing for said accessory; an annular member mounted on the outside of said housing, said annular member having a conical peripheral flange extending around said housing, said flange having an internal surface facing said housing and an opposite external surface and formed with uniformly spaced holes extending therethrough between the surfaces thereof; a cable end portion including a cable core projecting into said housing; an armature for said cable end portion, said armature comprising a plurality of wires enclosing said cable core outside said housing, said wires diverging at said housing so as to be spaced around the same; a plurality of externally threaded sleeves of a diameter less than the diameter of said holes in said conical flange rigidly secured to the ends of said armature wires and arranged in said holes projecting therethrough from the internal surface to the external surface of said flange; and nuts screwed onto said externally threaded sleeves and engaging said external surface of said flange for individually holding said wires and for adjusting the tension thereon.

2. A device for connecting two electric cables with an accessory comprising, in combination, a housing for said accessory; a pair of annular members mounted on the outside of said housing and having central portions arranged substantially parallel to each other, each of said annular members having a conical peripheral flange extending around said housing, each of said flanges having an internal surface facing said housing and an opposite external surface and formed with uniformly spaced holes extending therethrough between the surfaces thereof; two cable end portions each including a cable core projecting into said housing; an armature for each of said cable end portions, said armature comprising a plurality of wires enclosing said cable cores outside said housing, said wires diverging at said housing so as to be spaced around the same; a plurality of externally threaded sleeves of a diameter less than the diameter of said holes in said conical flanges rigidly secured to the ends of said armature wires and arranged in said holes projecting therethrough from the internal surface to the external surface of said flanges; and nuts screwed onto said externally threaded sleeves and engaging said external surface of the respective flanges for individually holding said wires and for adjusting the tension thereon.

3. A device for connecting two electric cables with an accessory comprising, in combination, a housing for said accessory; a pair of annular members mounted on the outside of said housing and having central portions arranged substantially parallel to each other, each of said annular members having a conical peripheral flange extending around said housing, each of said flanges having an internal surface facing said housing and an opposite external surface and formed with uniformly spaced holes extending therethrough between the surfaces thereof; a plurality of tie rods connecting said central portions of said annular elements with each other; two cable end portions each including a cable core projecting into said housing; an armature for each of said cable end portions, said armature comprising a plurality of wires enclosing said cable cores outside said housing, said wires diverging at said housing so as to be spaced around the same; a plurality of externally threaded sleeves of a diameter less than the diameter of said holes in said conical flanges rigidly secured to the ends of said armature wires and arranged in said holes projecting therethrough from the internal surface to the external surface of said flanges; and nuts screwed onto said externally threaded sleeves and engaging said external surface of the respective flanges for individually holding said wires and for adjusting the tension thereon.

4. A connecting arrangement as defined in claim 1, wherein the wires of said armature are bound adjacent the housing by steel wire wound around said armature.

5. A connecting arrangement as defined in claim 1 wherein said cable end portion has a single core, and said annular member is formed of non-magnetic material.

6. A connecting arrangement as defined in claim 1, wherein said cable is a three-phase cable, and said annular member is formed of magnetic material.

References Cited in the file of this patent

UNITED STATES PATENTS

| Number | Name | Date |
|---|---|---|
| 2,132,269 | McHugh | Oct. 4, 1938 |

FOREIGN PATENTS

| Number | Country | Date |
|---|---|---|
| 58,286 | Sweden | Feb. 17, 1925 |
| 450,027 | Germany | Sept. 29, 1927 |
| 489,510 | Great Britain | July 28, 1938 |
| 629,129 | Great Britain | Sept. 13, 1949 |